United States Patent [19]

White et al.

[11] Patent Number: 4,616,522
[45] Date of Patent: Oct. 14, 1986

[54] STEERING COLUMN ENERGY ABSORBING RELEASE BUSHING AND DEFORMING BRACKET

[75] Inventors: George E. White, Mt. Clemens; Dennis C. Heckel, West Bloomfield, both of Mich.

[73] Assignee: Chrysler Corporation, Highland Park, Mich.

[21] Appl. No.: 709,941

[22] Filed: Mar. 8, 1985

[51] Int. Cl.⁴ ............................................. B62D 1/16
[52] U.S. Cl. .................... 74/492; 280/777; 188/376
[58] Field of Search ............ 74/492; 280/777; 188/376

[56] References Cited

U.S. PATENT DOCUMENTS

| | | | |
|---|---|---|---|
| 3,415,139 | 10/1968 | Kimberlin et al. | 74/492 |
| 3,703,105 | 11/1972 | Milton et al. | 74/492 |
| 3,815,438 | 6/1974 | Johnson | 280/777 |
| 3,817,118 | 6/1974 | Kitzner et al. | 74/492 |
| 4,117,741 | 10/1978 | Yazane et al. | 188/376 |
| 4,445,708 | 5/1984 | Oakes et al. | 74/492 |
| 4,509,386 | 4/1985 | Kimberlin | 74/492 |

Primary Examiner—Lawrence Staab
Assistant Examiner—Martin G. Belisario
Attorney, Agent, or Firm—Edward P. Barthel

[57] ABSTRACT

An energy absorbing steering column assembly for a motor vehicle steering wheel. The column has a tubular jacket supported from the vehicle body by upper and lower sheet metal brackets. The upper bracket is connected to the body by releasable capsules. The jacket has a plastic end cap bushing fitted on its forward end. The bushing is releasably press fitted in a concentric collar portion of the lower bracket. Under predetermined impact loading on the steering wheel and column assembly, the capsules release the upper bracket allowing the column to be guided forward axially causing radial tabs on the bushing to be sheared-off in a first level energy absorption. Continued travel of the column assembly in a controlled lateral path provides second higher level energy absorption wherein the lower bracket is deformed in a controlled manner.

2 Claims, 15 Drawing Figures

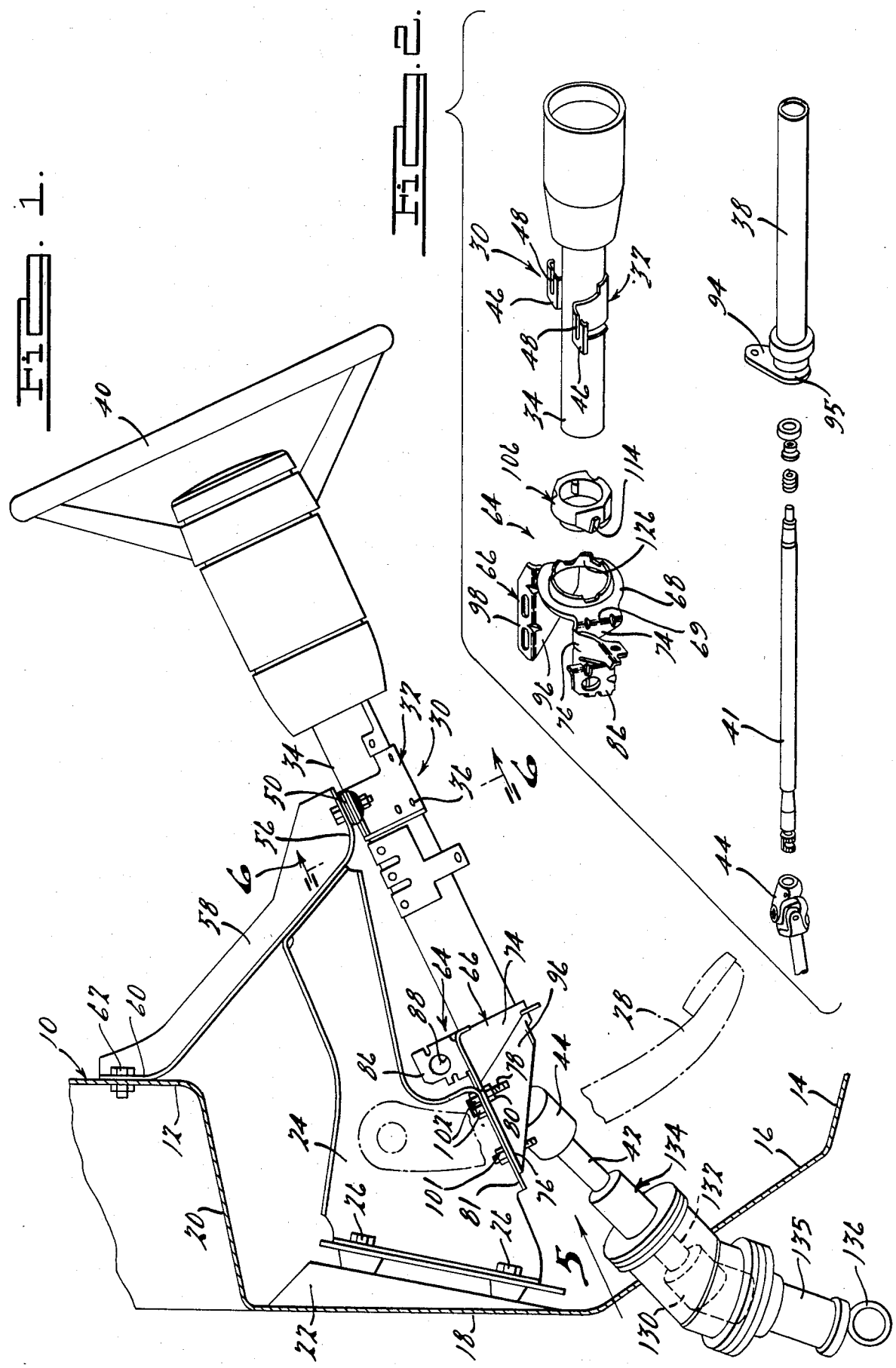

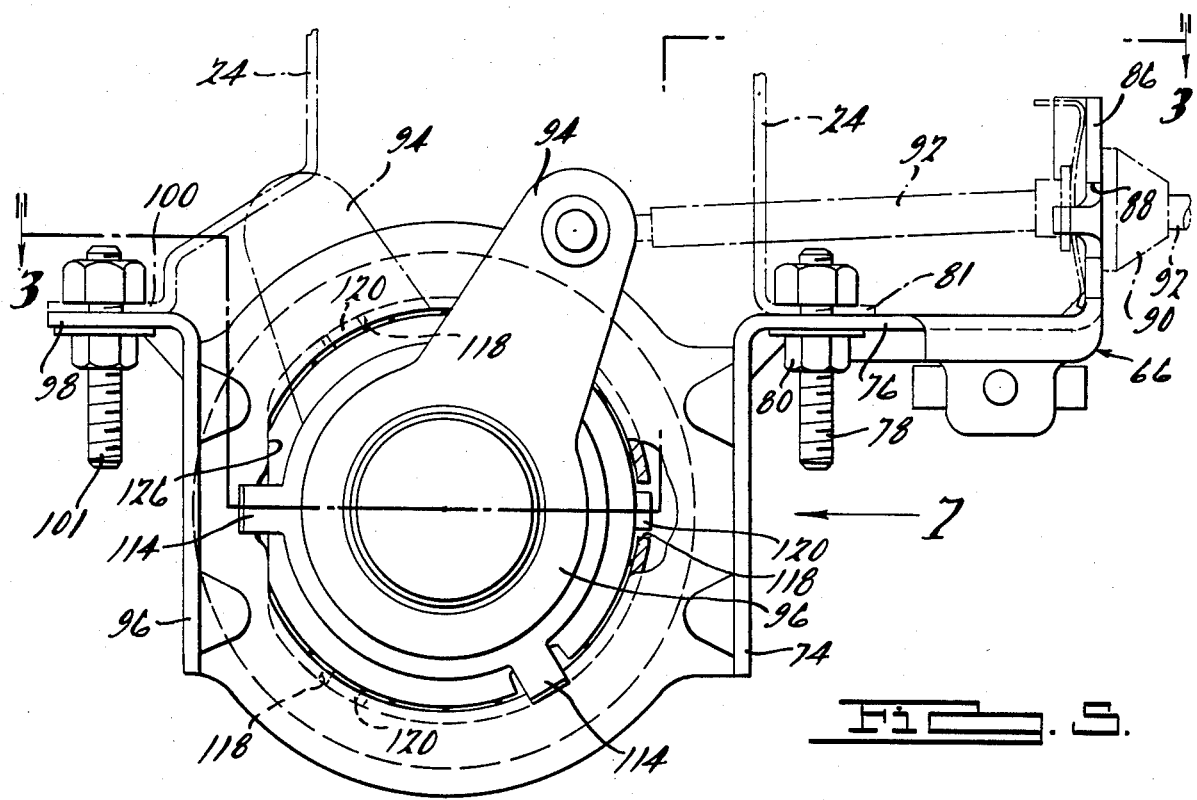
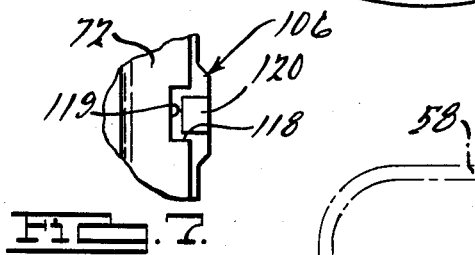
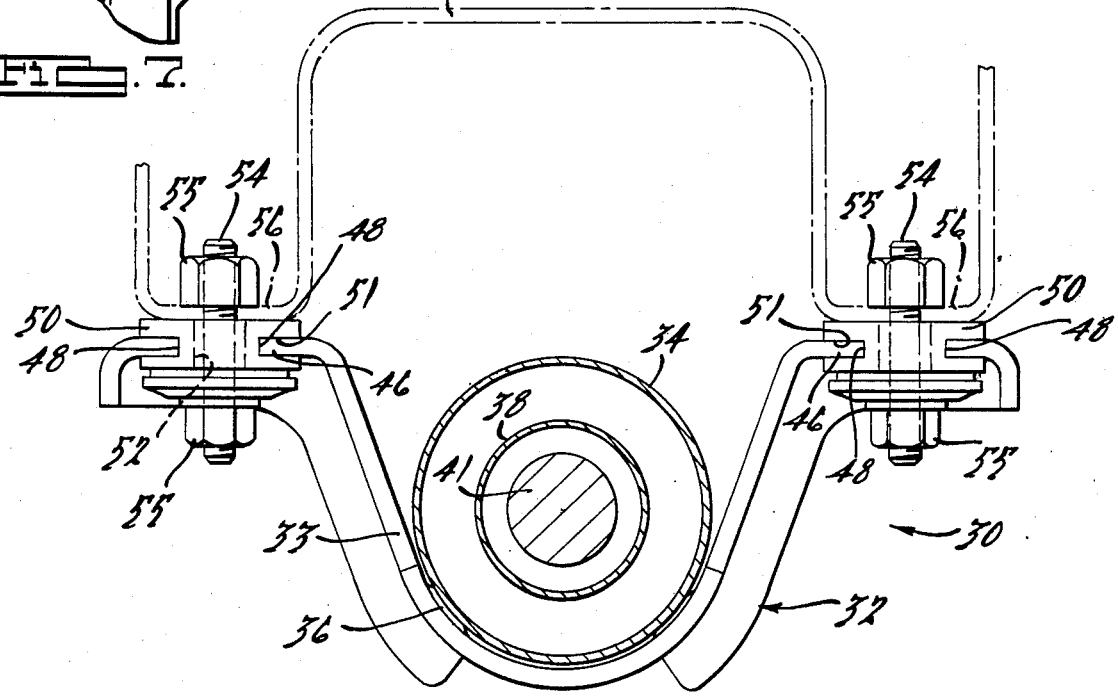

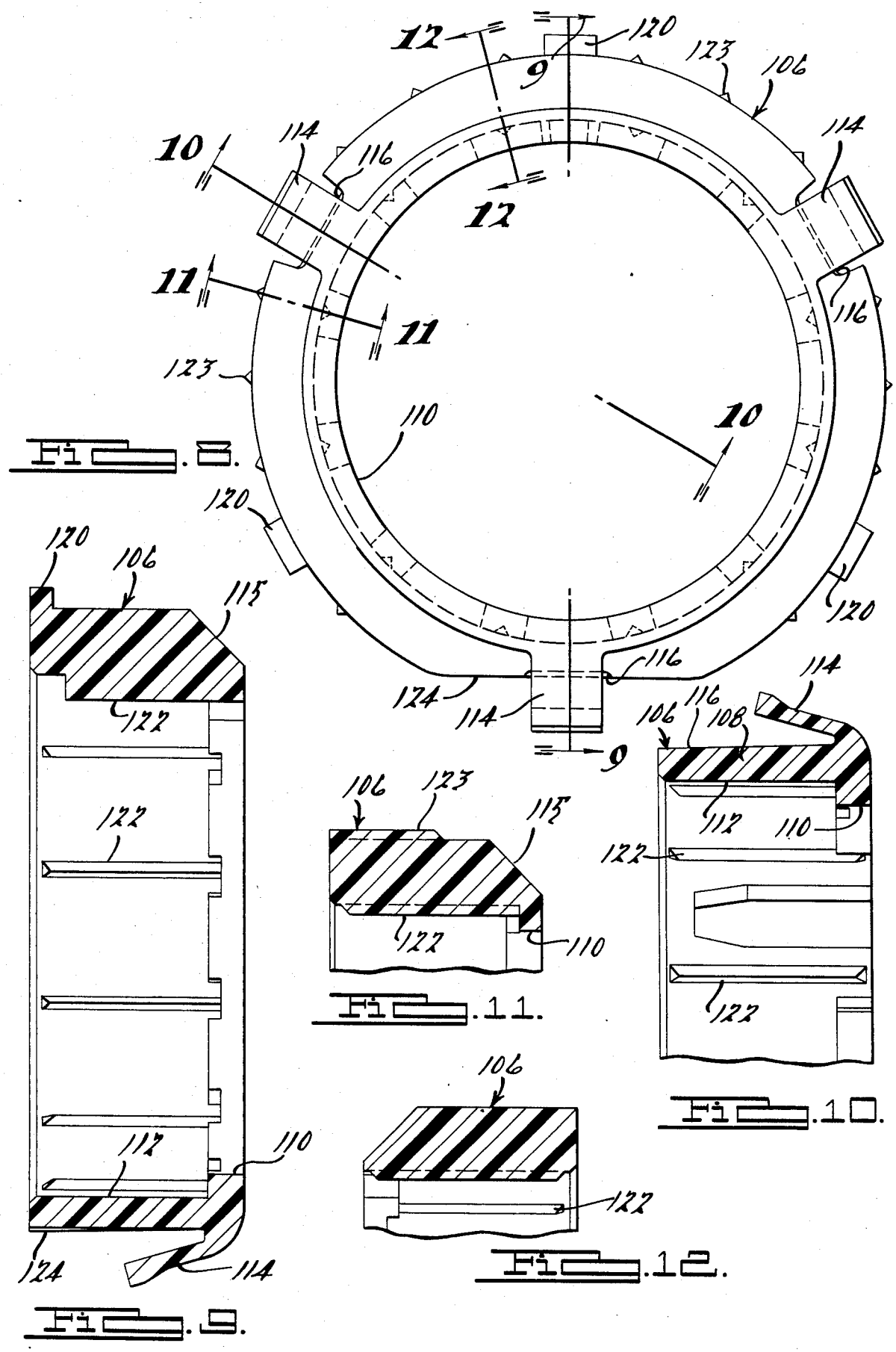

STEERING COLUMN ENERGY ABSORBING RELEASE BUSHING AND DEFORMING BRACKET

BACKGROUND OF THE INVENTION

The present invention relates to an energy absorbing steering column assembly for motor vehicles and more particularly to a solid steering column having a lower bracket supporting a break-away column end cap bushing designed for a first stage of energy absorption during axial travel of the column. Subsequent column oblique movement causes deformation of the lower bracket providing a second stage of energy absorption.

The prior art U.S. Pat. No. 4,117,741 issued Oct. 3, 1978 to Yazane et al. discloses an energy absorbing steering column wherein the steering shaft is coupled to the vehicle gear box by means of first and second universal joints thereby allowing the steering shaft to move forwardly relative to the vehicle gear box. The U.S. Pat. No. 3,702,081 issued Nov. 7, 1972 to Arnston shows a steering column assembly with a solid steering column secured by an upper bracket having break-away capsules which are releasably fastened to a body support member. The U.S. Pat. No. 3,415,139 issued Dec. 10, 1968 and U.S Pat. No. 3,643,981 issued Feb. 22, 1972, each disclose molded ring spacers or bushings providing force absorbing elements designed to support a steering shaft within an outer column.

BRIEF SUMMARY OF THE DISCLOSURE

In accordance with the preferred embodiments of the invention, a solid steering column is supported from the vehicle body by means of upper and lower sheet metal brackets. The upper bracket secures the column by means of conventional break-away capsules which are releasably fastened to a body support member. The lower bracket has a central collar member with a pair of arms extending forwardly from opposed sides of the collar. A plastic break-away end cap bushing is fitted on the lower end of the column and is releasably connected in the collar opening. The bushing has radial tabs adapted to be sheared off upon a predetermined impact on the steering wheel. The break-away capsules and bushing tabs provide sequential release of the column allowing first stage energy absorption. If the impact load is above a certain minimum, the column pivots against the lower bracket causing it to fold in a controlled manner providing second stage energy absorption. The column pivotal movement is achieved as a result of the upper and lower steering shaft universal joint connections pivoting together with the axial collapse of a lower shaft telescopic coupling.

BRIEF DESCRIPTION OF THE DRAWINGS

The many objects and advantages of the present invention will become apparent from the following discussions and the accompanying drawings, in which:

FIG. 1 is a side elevational view of a collapsible solid steering column assembly constructed in accordance with the present invention;

FIG. 2 is an exploded perspective view of the elements of the steering column assembly of FIG. 1;

FIG. 5 is an enlarged fragmentary end elevational view of the steering column of FIG. 1 looking in the direction of arrow 5;

FIG. 6 is an enlarged fragmentary cross sectional view taken substantially on line 6—6 of FIG. 1;

FIG. 7 is a fragmentary side elevational view of the lower bracket and impact bushing looking in the direction of arrow 7;

FIG. 8 is an enlarged detail front elevational view of the steering column and bushing;

FIGS. 9–12 are a series of cross-sectional view of the bushing of FIG. 8; and

DETAILED DESCRIPTION OF THE DISCLOSURE

Figure 3:
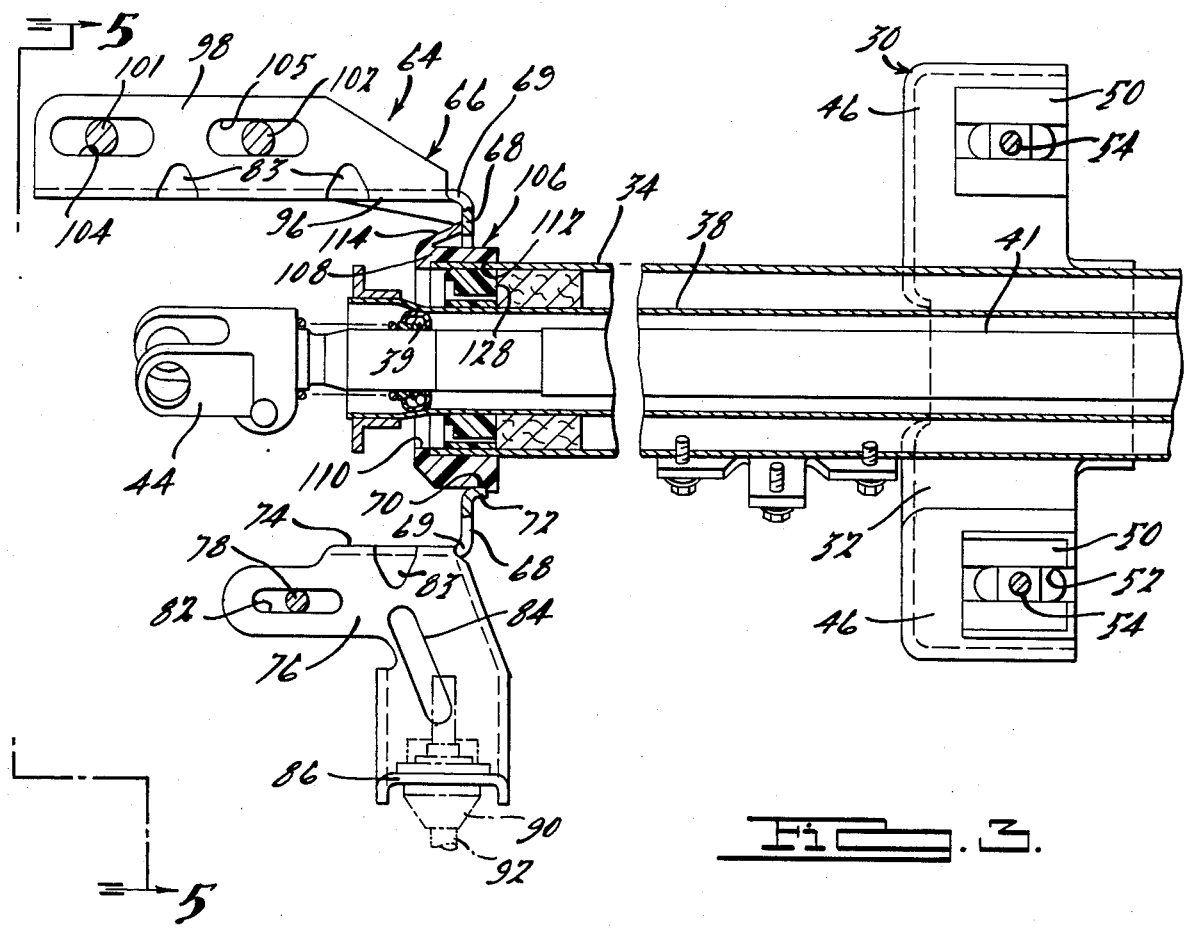
FIG. 3 is a fragmentary top plane view, partly in section, of the steering column assembly of FIG. 1.

Referring now to FIG. 1 of the drawings, a portion of the interior of an automobile vehicle body is thereshown which includes an instrument panel structure 10 having a vertical face panel 12. A front seat (not shown) is conventionally mounted on a floor panel 14 merging with a toe board 16 and a generally vertical firewall 18. The firewall 18 extends rearwardly at bridge panel 20 to the face panel 12. The firewall 18 includes a stamped portion 22 having a U-sectioned brake support bracket 24 (FIG. 6) secured thereto by a plurality of bolts 26. The bracket 24 pivotally supports a brake pedal lever, partially indicated in phantom at 28.

A steering column is supported at its upper end on the vehicle body by means of an upper break-away bracket assembly 30. The upper bracket assembly 30, as best seen in FIGS. 3 and 6, includes an upper sheet metal support bracket 32, having a central arcuate portion 33, and a rigid tubular steering column jacket 34. The bracket 32 is fixed to the jacket by means of a plurality of projection welds 36. The column jacket 34 encloses a transmission shift control tube 38 extending from a transmission control arm (not illustrated) adjacent steering wheel 40 to suitable linkage to control the vehicle transmission. An upper steering shaft 41, which transmits movement from the steering wheel to a lower steering shaft 42 via upper universal joint 44, is journally mounted within the control tube 38 by a plurality of annular ball bearing cages, the lower one of which is indicated at 39 in FIG. 3.

Figure 4:
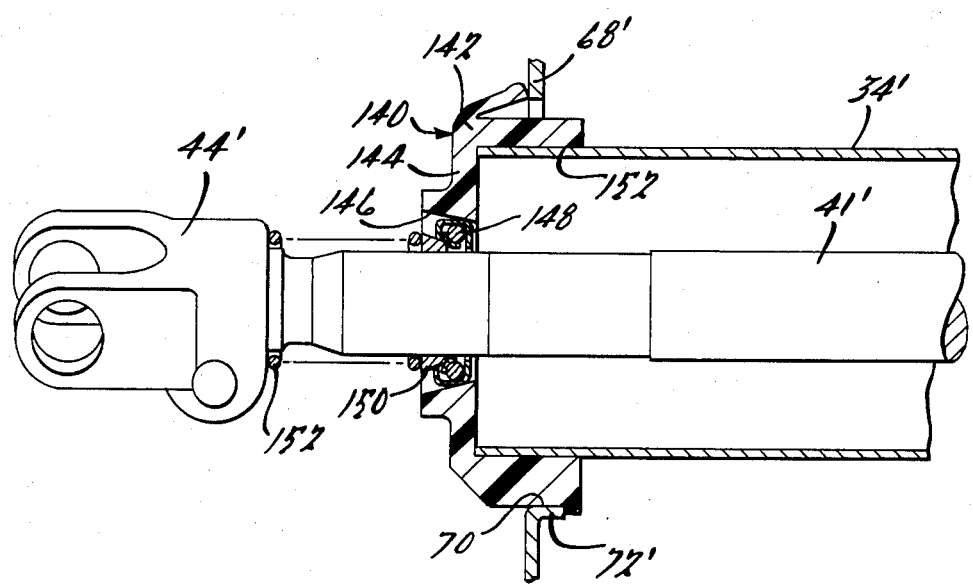
FIG. 4 is an enlarged fragmentary cross sectional view of an alternate form of the invention.

As seen in FIGS. 2, 3 and 4 the upper break-away bracket 30 has a pair of planar side portions or ears 46. Each ear is oriented transversely of the column structure and includes a rearwardly opening rectangular cut-out 48. Inserted into the cut-outs 48 are releasable mounting capsules 50 received through grooves 51 formed therein. Each mounting capsule 50 attaches to the body by means of elongated aperture 52 therein receiving a mounting stud 54 threadably coupled with a nut 55 on each end as shown in FIG. 6. The studs 54 exert a frictional clamping force on the capsules 50 to secure the upper bracket ears 46 to flanges 56 at the rearward end of support brace 58. The support brace forward end has flanges 60 secured to the vertical instrument panel structure 10 by bolts, one of which is shown at 62. The releasable bracket 32 initially moves with the column jacket 34 in a direction substantially parallel with the axis of the upper steering shaft 41.

It will thus be seen that the clamped capsules 50 permit the steering column jacket 34 and wheel 40 to be moved forwardly relative to the instrument panel structure 10 and brace 58. This occurs when the frictional gripping force of the capsules on the bracket ears 46 is overcome by the application of a predetermined force on the steering wheel 40 by the driver. This results in the upper bracket 32 being free to slide clear of the capsules. During the initial stage of this movement, the capsules guide the upper bracket and column jacket for travel along the axis of the shaft 41.

As seen in FIG. 1 a lower bracket assembly is shown at 64 supporting the forward end of column jacket 34. The assembly 64 includes an asymmetrical shaped lower bracket 66 having a central collar portion 68 formed with a circular aperture 70. The column jacket 34 projects through the aperture 70 defined by a tubular rim 72 concentrically spaced about the jacket 34 and extending rearwardly toward the steering wheel.

As best seen in FIGS. 2 and 3 the lower bracket collar portion 68 has a pair of wings joined thereto for impact deformation about right angled radiused bends 69. Each wing extends toward the firewall 18 in a vertically disposed plane parallel to the principal axis of the jacket 34. The first outboard wing 74, having a generally triangular shape, terminates in a short flange 76. The short flange 76 is secured by a threaded stud 78 and nut 80 to an outwardly extending flange 81 (FIG. 1) of the brake support bracket 24. The stud 78 extends through longitudinal slot 82 to provide for axial adjustment of the lower bracket 64. The lower bracket 66 angular junctures are formed with dart-like creases 83 and the flange with an oblique elongated depression 84 to increase the stiffness of the bracket's various portions.

FIG. 5 shows the short flange outboard end terminating in a right angle flange 86 formed with an aperture 88 for supporting a grommet 90 of a Bowden transmission control cable mechanism 92. The cable mechanism 92 has its one end secured to an arm portion 94 of a control ring 95 fixed to rotate the transmission control tube 38 by reciprocal movement of the cable mechanism.

As seen in FIGS. 2 and 3 the lower bracket second generally triangular shaped wing 96 terminates in a long flange 98. The long flange is similarly secured to an inwardly extending flange 100 of the support bracket 24 by a pair of threaded studs 101 and 102 extending through two longitudinally aligned adjustment slots 104 and 105, respectively.

With reference to FIG. 3 it will be seen that the jacket 34 is concentrically supported in the lower bracket aperture 70 by means of an end cap spacer or impact breakaway bushing 106. The bushing, formed of a rigid synthetic molded plastic material, includes a tubular body portion 108 adapted to be axially inserted over the forward end of the column. The body 108 contains a through bore 110 with a counter-bore recess 112 that receives, preferably with an interference press fit, the forward end portion of the tubular column jacket 34. The bushing 106 also includes a plurality of integral flexible locating fingers 114 extending rearwardly from a chamfered pilot portion 115 (FIG. 9). The fingers are radially flexed inwardly upon insertion of the bushing through the aperture 70. Aligned with the fingers 114 are recesses 116 into which the fingers move to allow the bushing to pass through the aperture 70.

The bracket tubular rim trailing edge is formed with a plurality of equally spaced lanced-out notches best shown at 118 in FIGS. 5 and 7. In the disclosed form there are three notches 118 circumferentially spaced around the rim 72 centered on 120 degree circular angles. Each of the notches registers with a radial tab 120 formed integral with the plastic bushing 106. The tabs 120 are circumferentially spaced around the bushing 106 and are received in their associated notch 118. The tabs 120 prevent steering column axial travel or forward "push-out" under predetermined steering wheel low impact load conditions. The tabs 120, however, are designed to shear-off under predetermined steering wheel impact loads exceeding the low load condition to permit forward axial travel of the steering column jacket 34.

It will be noted that the impact bushing locating fingers 114 are designed to engage the forward face of collar 68 and axially locate the column relative to the lower bracket 66 during assembly line installation. Further, as seen in FIGS. 8 and 9 the impact bushing has a plurality of longitudinal inner crush ribs 122 formed in the counter bore recess 112 for press-fit on the column. The bushing is also adapted for a press-fit insertion in the tubular rim aperture 70 by virtue of integrally formed longitudinal outer crush ribs 123 molded on the outer surface of the bushing 106. FIG. 8 shows the impact bushing formed with a tangent external flat portion 124 adapted to align with a conforming internal linear edge 126 on the bracket locating collar 72. Upon the radial alignment of the internal edge 126 and external flat 124, the bushing is readily assembled in the aperture 70 with the radial shear tabs 120 axially aligned with and received in their associated notches 118.

In FIG. 3 it will be seen that a plastic shift tube support spacer ring 128 is provided. The ring 128 is inserted in a press-fit manner between the shift tube 38 and the jacket 34 to concentrically position and support the jacket 34 about the shift-tube 38.

As seen in FIGS. 1, 13, 14 and 15 the lower steering shaft 42 is connected to a lower universal joint 130 by means of a stub shaft 132 portion of telescopic joint 134. One type of such joint is shown in co-pending U.S. patent application Ser. No. 06/637,989 filed Aug. 6, 1984 entitled Telescopic Shaft Coupling Arrangement. This application is assigned to the same assignee as the instant application. The telescopic joint 134 has its lower end connected to a steering gear 136 of a conventional front axle steering system such as a power rack and pinion steering gear shown, for example, in U.S. Pat. No. 4,454,801 issued June 19, 1984 to Spann.

Figure 13:
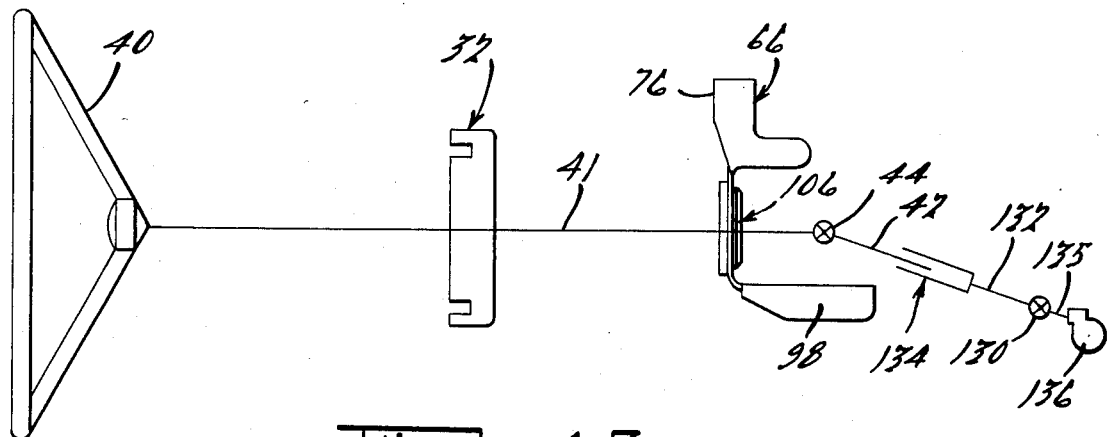
FIGS. 13–15 are three schematic top views of the steering column assembly of FIG. 1 showing positions of the various elements before and after impact.
Figure 14:
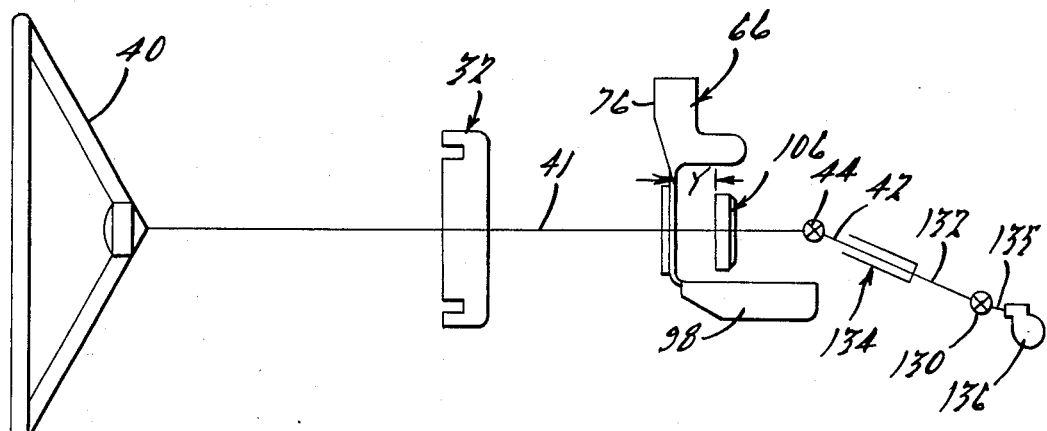
Figure 15:
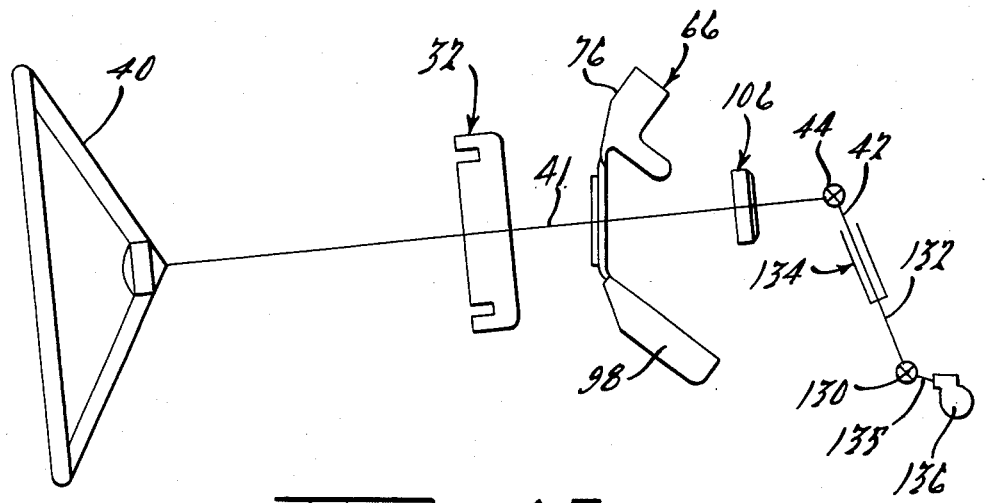

The operation of the energy absorbing steering column is shown in schematic fashion in FIGS. 13, 14 and 15. On application of a load, to the steering wheel exceeding a predetermined low impact load, the capsules 50 release the column upper bracket 32 and the column and bracket begin to move axially. This movement causes the impact bushing tabs 120 to be sheared-off by the fixed lower bracket 66. As a result the steering column 34, upper bracket 32 and bushing 106 are allowed to initially move axially forward relative to the lower bracket 66 by telescopic movement of joint 134 as shown in FIG. 14. In the form disclosed this movement is of the order of 1 to 2 inches.

It will be noted in FIG. 7 that each notch 118 has its transverse shearing edge 119 spaced from its associated shear tab 120. Upon the application of a predetermined impact load on the steering wheel, the upper bracket 32 initially slides on the vehicle body capsules 50 in a guided aligned manner. This results in the jacket 34 and bushing 106 initially moving forwardly along their principal axis insuring that the bushing radial tabs 120 are each sheared off in unison by their associated notch edges 119. As seen in FIG. 14, the shearing of tabs 120 allow the jacket 34 to travel a predetermined distance Y during a first stage or level of energy absorption. Because of the releasable capsules 50 and the collapse of the telescopic joint 134, the jacket's first stage movement the distance Y is substantially coaxial with the shaft 41.

Upon the completion of the first stage energy absorption, further loading of the steering wheel causes the universal joints 44 and 130 to to pivot. As seen in FIG. 15, the joint 44 moves in an outboard skewed manner because the joint 130 is fixed to the front axle steering system gear box 136 by means of input shaft 135.

If the impact load exerted against the steering wheel exceeds a second stage predetermined level, it will cause continued pivoting of the universal joints 44 and 130 resulting in oblique or lateral outward movement of the jacket 34 as illustrated in FIG. 15. The steering column jacket's lateral travel results in controlled deforming contact with the locating collar 72 of the lower supporting bracket 66. This plastic deformation of the bracket 66 provides a second higher stage or level of controlled energy absorption resistance by folding or buckling at the right angled bend junctures 69 of its short flange 76 and its long flange 98 with the collar portion 68. The lower bracket 66 controlled deformation, shown in FIG. 15, has been exaggerated for the purpose of illustration.

In FIG. 4 an alternate form of the invention is shown for a steering column that does not have a column mounted shift lever. In FIG. 4 the same or similar elements have been given the same numerals with primes added. It will be noted that a modified impact bushing 140 includes a tubular body portion 142 formed of molded plastic material. The body portion 142 has an end wall 144 formed with a cone sectioned bore 146. The bore 146 seats a ball bearing assembly 148 therein which has another wedge ring 150 retained by compression spring 152. The bushing 140 has an internal bore 154 which receives the forward end of the steering column by means of an interference press fit.

While only one embodiment has been described, those skilled in the art will appreciate that others may be possible without departing from the scope of the following claims.

What is claimed is:

1. An energy absorbing steering column assembly for an automotive vehicle body, said steering column assembly comprising an axially extending upper steering shaft having its upper end connected to a steering wheel and its lower end connected by means of a lower shaft to a vehicle steering gear assembly by universal joint means, a tubular steering column jacket surrounding said upper shaft, an upper bracket fixed to said jacket intermediate its upper and lower ends, said upper bracket releasably supporting said jacket to said body by a plurality of releasably impact responsive capsules, the improvement wherein an energy absorbing sheet metal lower support bracket formed with a central collar portion defining a circular aperture, the lower end of said jacket extending through said aperture in concentric spaced relation, said lower bracket having a pair of flanged wings extending forwardly from diametrically opposite sides of said collar portion, each said wing joined for impact deformation to said collar portion at a right angled radiused juncture wherein each said wing extends in a vertically disposed plane parallel to the principal axis of said jacket, fixedly secured to said vehicle body, a bushing formed of rigid plastic material concentrically received in a press fit manner into said collar aperture, said bushing having a tubular body portion containing a central through bore, said through bore formed at its upper end with a counterbore recess sized to receive the forwrad end of said jacket in a press fit manner, said bushing formed with a plurality of resilient fingers extending outwardly from its leading edge, each finger being radially depressible inwardly for assembly through said collar aperture, each said finger having its trailing free end juxtaposed said collar portion, said bushing formed with a plurality of tabs extending radially outwardly from said tubular body portion, said collar aperture including a tubular flanged rim concentrically spaced about said jacket with said flanged rim free edge extending rearwardly toward said steering wheel, a plurality of equally spaced tab receiving notches formed in said flanged rim, each said notch longitudinally aligned with an associated tab and sized so as to receive at least a portion of its associated tab therein, and wherein each said notch having a base defining a transverse shearing edge portion, such that upon the application of a predtermined load on said steering wheel said upper bracket initially is released from said capsules for forward travel in a guided manner relative to said vehicle body, whereby said jacket moves forwardly causing each said tab to be sheared-off by its associated collar member shear edge providing a first stage engergy absorption; and whereby upon said tabs being sheared off said jacket continuing to travel forwardly in a generally oblique manner contacting said collar portion whereby said wings are deformed about their radiused junctures providing a second stage energy absorption.

2. An energy absorbing steering column assembly for an automotive vehicle body, said steering column assembly comprising an axially extending upper steering shaft having its upper end connected to a steering wheel and its lower end connected by means of an oliguely extending lower steering shaft to a vehicle steering gear assembly by an upper universal joint to said lower steering shaft, said lower shaft connected in turn by means of a telescopic joint to a lower universal joint which is joined to an input shaft fixedly secured to a steering gear box, a tubular steering column jacket surrounding said upper shaft, an upper bracket fixed to said jacket intermediate its upper and lower ends, said upper bracket releasably supporting said jacket to said body by a plurality of releasable impact responsive capsules, the improvement wherein an energy absorbing sheet metal lower support bracket formed with a central collar portion defining a circular aperture, the lower end of said jacket extending through said aperture in concentric spaced relation, said lower bracket having a pair of flanged wing portions extending forwardly from diametrically opposite sides of said collar portion, with each said wing portion fixedly secured to said vehicle body, each said wing joined for impact deformation to said collar portion at a right-angled radiused juncture such that each said wing extends in a vertically disposed plane parallel to the principal axis of said jacket, a bushing formed of rigid plastic material concentrically received in a press fit manner into said collar aperture, said busing having a tubular body portion containing a central through bore, said through bore formed at its upper end with a counterbore recess sized to receive the forward end of said jacket in a press fit manner, said bushing formed with a plurality of resilient fingers extending outwardly from it leading edge, each finger being radially depressible inwardly for assembly through said collar aperture, each said finger having its trailing free end juxtaposed said collar portion, said busing formed with a plurality of tabs extending radially outwardly from said tubular body portion, said collar aperture including a tubular flanged rim concentrically spaced about said jacket with said flanged rim free edge extending rearwardly toward said steering wheel, a plurality of equally spaced tab receiving notches formed in said flanged rim, each said notch sized so as to receive at least a portion of an associated tab therein, each said notch having a base defining a transverse shearing edge, such that upon the application of a predetermined load on said steering wheel said upper bracket initially is released from said capsules for forward travel in a guided manner relative to said vehicle body, whereby said jacket moves forwardly by virtue of said telescoping joint collapsing causing each said tab to be sheared-off by its associated notch shear edge providing a first stage energy absorption, sad whereby upon said tabs being sheared-off said jacket continuing its forward travel in a generally oblique manner contacting said collar portion as a result said upper and lower steering shafts pivoting about said first and second universal joints, whereby said wings are deformed about their radiused junctures providing a second stage energy absorption.

* * * * *